(12) United States Patent
Gugerli

(10) Patent No.: US 9,144,341 B2
(45) Date of Patent: Sep. 29, 2015

(54) DEVICE FOR PREPARING A BEVERAGE

(75) Inventor: Raphael Gugerli, Kilchberg (CH)

(73) Assignee: DELICA AG, Birsfelden (CH)

( * ) Notice: Subject to any disclaimer, the term of this patent is extended or adjusted under 35 U.S.C. 154(b) by 343 days.

(21) Appl. No.: 13/634,164

(22) PCT Filed: Mar. 14, 2011

(86) PCT No.: PCT/EP2011/053771
§ 371 (c)(1),
(2), (4) Date: Sep. 11, 2012

(87) PCT Pub. No.: WO2011/117096
PCT Pub. Date: Sep. 29, 2011

(65) Prior Publication Data
US 2013/0004637 A1    Jan. 3, 2013

(30) Foreign Application Priority Data
Mar. 24, 2010    (EP) ..................................... 10157451

(51) Int. Cl.
*A47J 31/00*    (2006.01)
*A47J 31/36*    (2006.01)
(52) U.S. Cl.
CPC .......... *A47J 31/3633* (2013.01); *A47J 31/3638* (2013.01)
(58) Field of Classification Search
CPC ........................... A47J 31/3638; A47J 31/3633

USPC ............. 99/302 P, 297, 295, 289 R; 426/433, 426/425, 435
See application file for complete search history.

(56) References Cited

U.S. PATENT DOCUMENTS

2009/0249961 A1* 10/2009 Cheng ......................... 99/289 R

FOREIGN PATENT DOCUMENTS

| EP | 1721553 | A1 * | 11/2006 |
| EP | 1757212 | | 2/2007 |
| WO | 2008/004116 | | 1/2008 |

* cited by examiner

*Primary Examiner* — Jianying Atkisson
(74) *Attorney, Agent, or Firm* — Nath, Goldberg & Meyer; Jerald L. Meyer

(57) ABSTRACT

Two chamber parts are pressed against each other in a sealing manner in order to receive a capsule. In an open position, the capsule can be held in an intermediate position between the chamber parts by a positioning unit having mutually opposite guide sections for guiding the capsule on mutually diametrically opposite sections of the capsule collar in order to hold the capsule in the intermediate position. The insertion section is formed as a hinged guide and the opposite guide section as a release guide. The release guide has a recess formed in such a way that the capsule can be rotated out of the intermediate position around the hinge guide and can be released from the release guide. Before reaching the closed position, the capsule is freed from the release guide in first and second movement phases by being acted on by one of the chamber parts.

17 Claims, 7 Drawing Sheets

Figure 1:
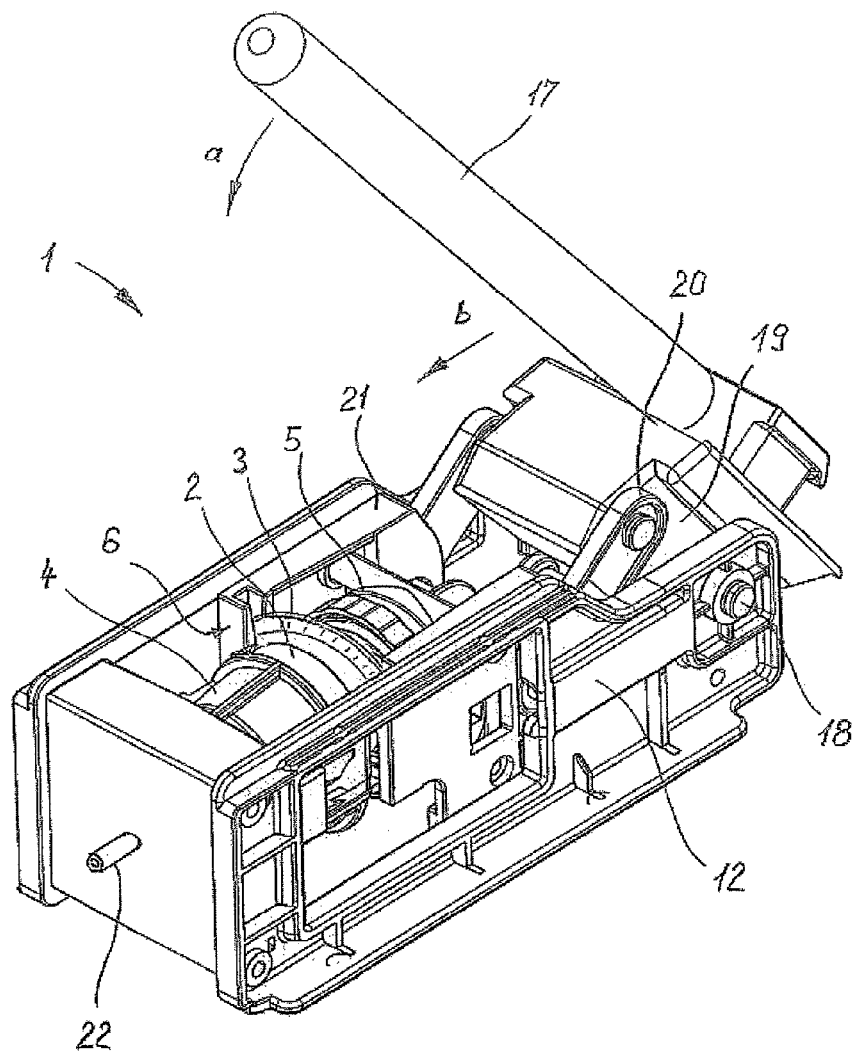

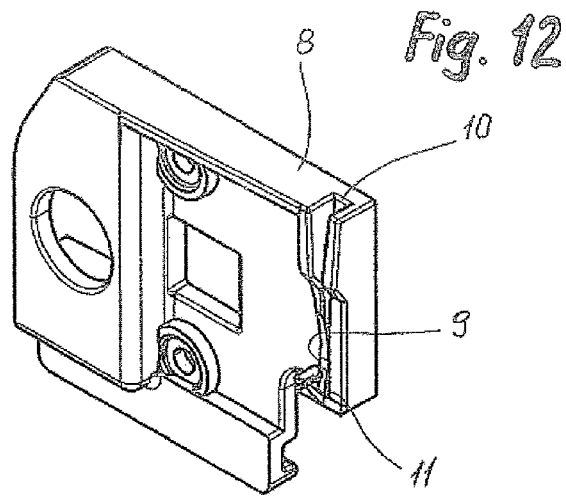
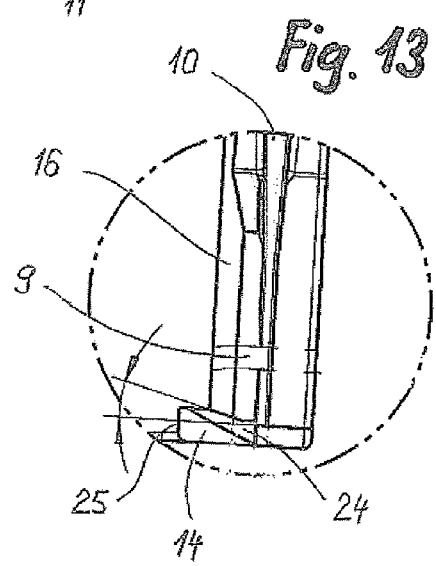
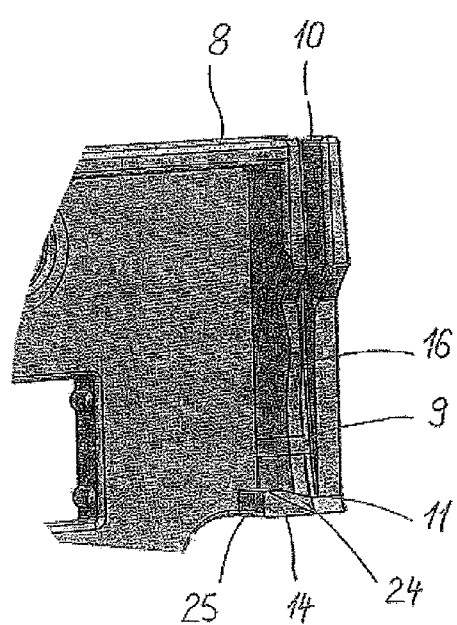

DEVICE FOR PREPARING A BEVERAGE

This is a National Phase Application filed under 35 U.S.C. 371 as a national stage of PCT/EP2011/053771, filed Mar. 14, 2011, and claims priority benefit from European Application No. 10157451.5, filed Mar. 24, 2010, the content of each of which is hereby incorporated by reference in its entirety.

The invention relates to a device for preparing a beverage from a substance, which is contained in a capsule with a circumferential collar, using a liquid according to the preamble of claim 1. Devices of this kind have long been used, for example, for producing coffee or tea. The capsules may be relatively rigid, pot-like containers, for example composed of plastics material, aluminum, comprising a laminate. However, other forms of individual packages with a circumferential collar, for example flat pods, are also feasible.

Comparable capsules have been disclosed, for example, in EP 1 500 357 and EP 1 944 248. In said documents, the capsules have a main body with a preferably rotationally symmetrical receptable and a flange-like collar which adjoins said receptable. The receptable is sealed with a film or foil for the purpose of hermetically packaging the product to be packaged, said film or foil being, for example, welded to the collar or being attached in some other way depending on the material.

In addition, EP 1 757 212 or WO 2008/004116, for example, have disclosed devices in which the capsule is held in an intermediate position between the two chamber parts by means of a positioning unit, before said chamber parts are closed for the brewing process. In both cases, the lateral guide sections are spread apart over the course of the closing movement, and therefore the two chamber parts can be pressed against one another in a sealing manner. When the chamber parts are opened, the capsule drops under the action of the force of gravity, without the positioning unit interfering with the dropping movement. A significant disadvantage of these spreadable guide sections is that numerous moving parts are required which make construction complicated and expensive. Lateral movement also requires space, and therefore a slim design is difficult to achieve.

It is therefore an object of the invention to provide a device of the type cited in the introductory part which is simplified in respect of functionality and design. In this case, the device should have as few moving components as possible and nevertheless operate in a reliable manner. The construction should allow for a slim design and be cost-effective to produce. In addition, as far as possible, no forces or only very small forces should act on the circumferential collar of the capsule when it is freed from the positioning unit since a deformed collar can have a negative influence on the leak-tightness of the brewing chamber. Ejection of the spent capsule after the brewing process can also be made more difficult if the collar is deformed. According to the invention, these objects are achieved by a device which exhibits the features in claim 1.

The asymmetrical design of the two opposite guide sections on the one hand as an articulation guide and on the other hand as a release guide with a recess allows the capsule to be freed from the positioning unit in an extremely simple manner without laterally moving parts and virtually without any appreciable exertion of force on the circumferential collar. The capsule which is held loosely in the positioning unit executes a serpentine movement when the chamber parts are closed, as a result of being acted on by one of the chamber parts, it being possible for said serpentine movement to be divided substantially into two movement phases. In a first movement phase, the capsule is rotated somewhat about the articulation guide out of the intermediate position and, in the process, is released from the release guide. In this case, the capsule is positioned at a specific angle obliquely to the closing direction or to the vertical insertion plane. In a second movement phase, the capsule executes a lateral movement, with said capsule being freed from the articulation guide and being returned with its longitudinal axis again approximately parallel to the direction of the movement of the chamber parts.

The articulation guide is particularly advantageously designed such that it allows the capsule to rotate or tilt through an angle of 0° to 45° out of the vertical insertion plane. However, even a rotation of less than 15° is generally sufficient. In this case, the articulation guide can allow this rotary movement on account of having a guide groove, which is approximately V-shaped or approximately U-shaped in cross section, at least in the region of the intermediate position. Depending on the opening angle of the groove, a tilting articulation with a relatively small or relatively large tilting angle is formed. However, as an alternative or in addition, the guide groove could also have a flexible wall section in the region of the intermediate position, and therefore the guide groove can be widened for the purpose of rotating or tilting the capsule.

The two guide sections are preferably designed such that, at their lower end, they form a support for the collar for the purpose of holding the capsule in the intermediate position. However it would also be feasible for the capsule to be supported by means of a separate element, which is not associated with the guide sections, in the intermediate position.

One of the chamber parts is preferably arranged fixedly on a frame, with the other chamber part being mounted in the frame in a displaceable manner. However, it would also be feasible for the two chamber parts to be mounted in a moveable manner, and for said chamber parts to move toward one another for the purpose of reaching the closed position. In this case, it is particularly advantageous when the positioning unit is associated with the displaceable chamber part or one of the displaceable chamber parts. In this case, the positioning unit moves together with the associated chamber part. However, it goes without saying that it would also be feasible for the positioning unit to be arranged in a relative fixed manner.

The fixedly arranged chamber part is preferably in the form of a capsule holder with a cavity for accommodating the capsule and the displaceable chamber part is preferably in the form of a closure element for closing the cavity. However, depending on the configuration of the capsule, the two chamber parts could also both have a cavity and, in this case, be designed in an approximately symmetrical manner.

The dimensions of the capsule holder and positioning unit are preferably selected such that the two guide sections can be pushed over the capsule holder on either side when the cavity is closed. In this way, the capsule can particularly advantageously be deposited in the cavity before the two chamber parts are pressed against one another in a sealing manner.

In order to facilitate ejection of the capsule when the brewing chamber is opened again, it is particularly expedient when one of the chamber parts has a spring which can be compressed in the closed position when the capsule is accommodated. As soon as the closing pressure abates and the chamber parts are moved away from one another again, the capsule is ejected with the aid of the spring. Said spring is advantageously a helical compression spring.

Removal of the capsule can be further assisted by the positioning unit having retrieval means with which the capsule can be retrieved from one of the chamber parts by way of its collar. This ensures that the capsule does not remain in one of the chamber parts on account of excessively high adhesion forces or possibly on account of a vacuum. The retrieval means can be a wedge projection which is arranged beneath the recess on the release guide. Said wedge projection advantageously has a run-on surface which is inclined toward the insertion plane, and a retrieval surface which is situated approximately in the insertion plane. The run-on surface serves to slightly raise the capsule out of the release guide when the capsule edge is freed, and therefore the retrieval surface can engage with the capsule edge during the opening movement.

The articulation guide particularly advantageously has a guide ramp which forces the capsule to perform a lateral movement when the capsule is freed from the articulation guide in the second movement phase. This ensures that the capsule collar does not remain in the guide groove of the articulation guide but rather is pushed away laterally by the guide ramp. As a result, the capsule returns to its normal position relative to the two chamber parts. The lateral movement can be further assisted on account of the release guide having a bevel in the region of the recess. This bevel prevents the capsule collar from abutting against the release guide during the lateral return movement.

The capsule is acted on for the purpose of triggering the serpentine movement, and therefore for the purpose of freeing said capsule from the positioning unit, by one of the chamber parts. Said chamber part can also be an element which is associated only with one of the chamber parts. Said capsule is particularly advantageously acted on by a compressible spring which at the same time assists in ejecting the capsule from the cavity. This additionally has the further advantage that, as the spring strikes the capsule, a pressure is gradually built up until finally the serpentine movement is triggered. This additionally reduces the risk of damage to the capsule.

Figure 2:
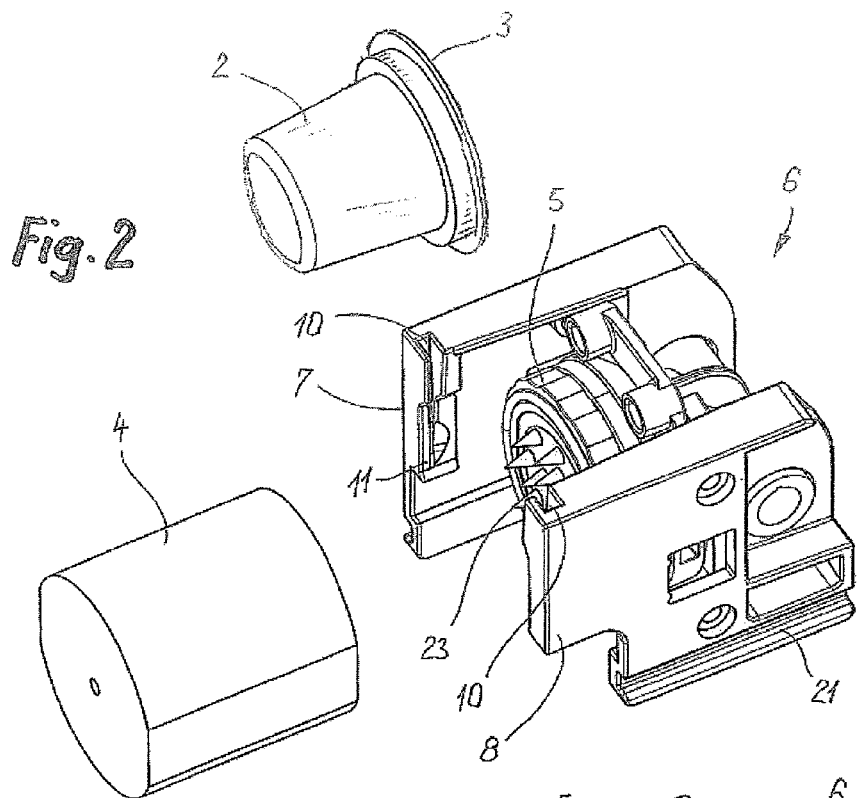
Figure 3:
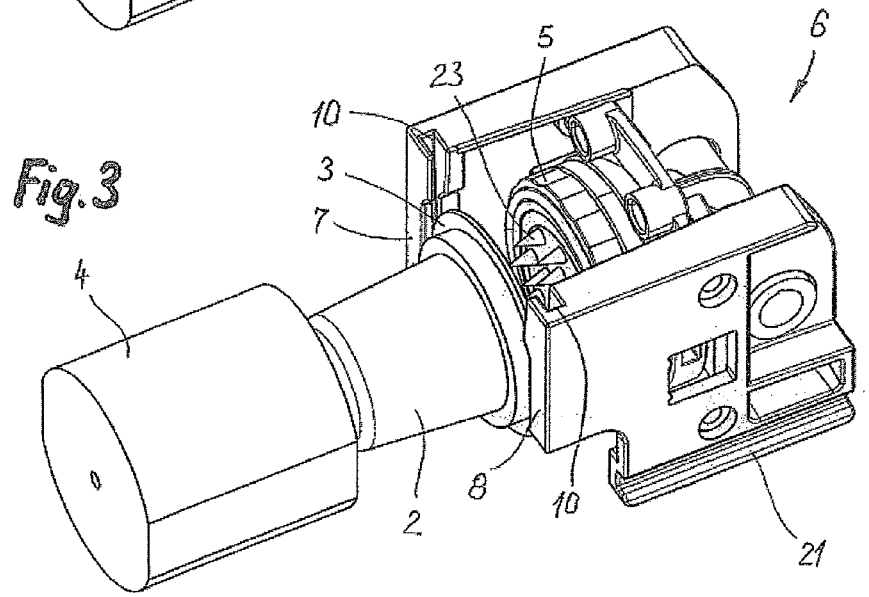
Figure 4:
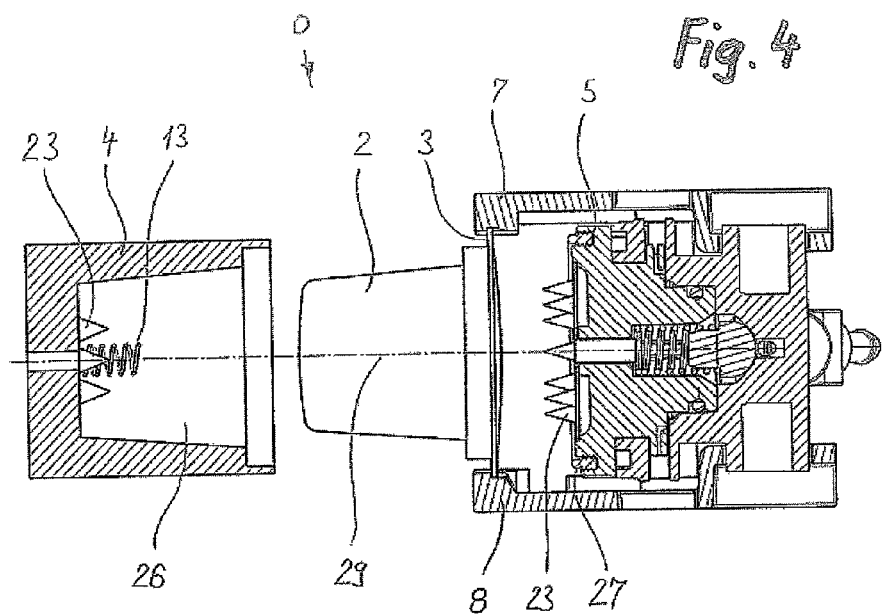
Figure 5:
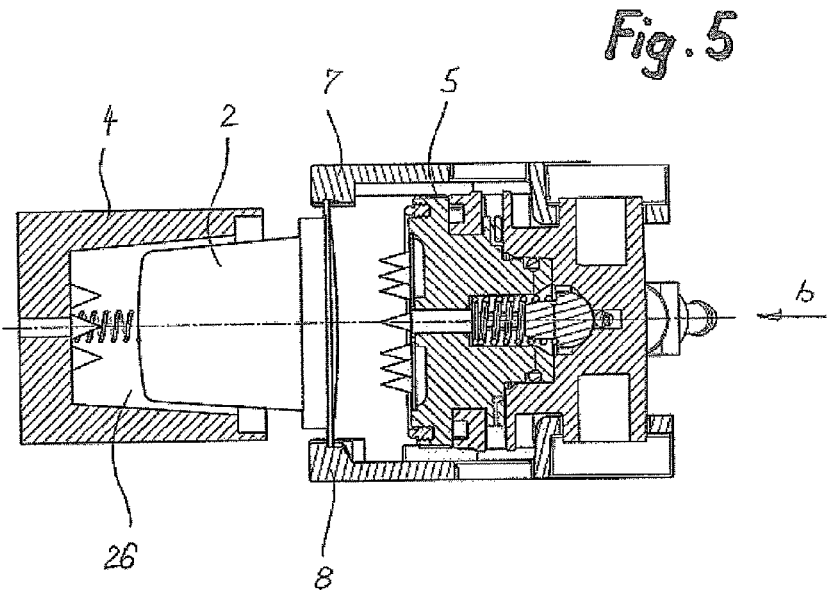
Figure 6:
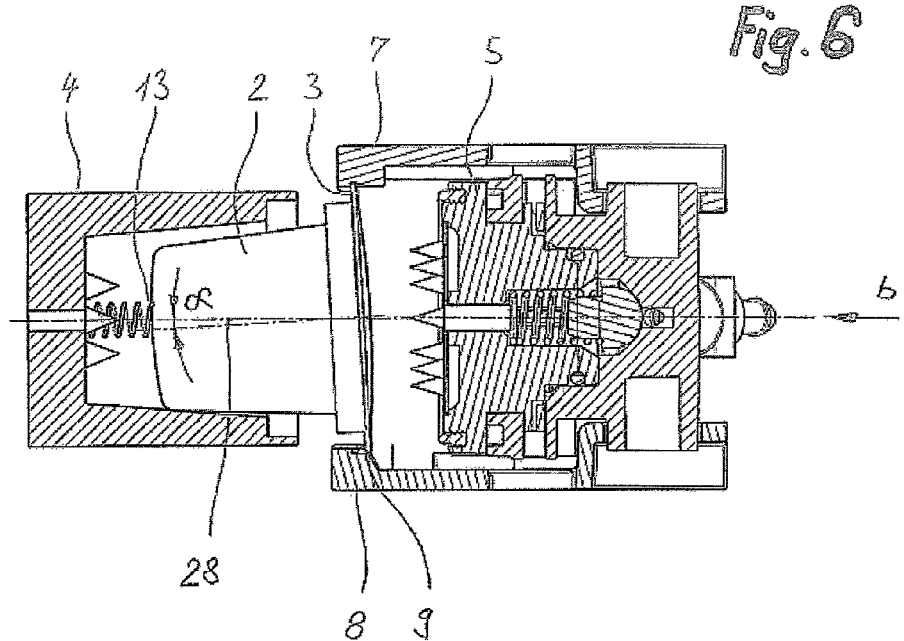
Figure 7:
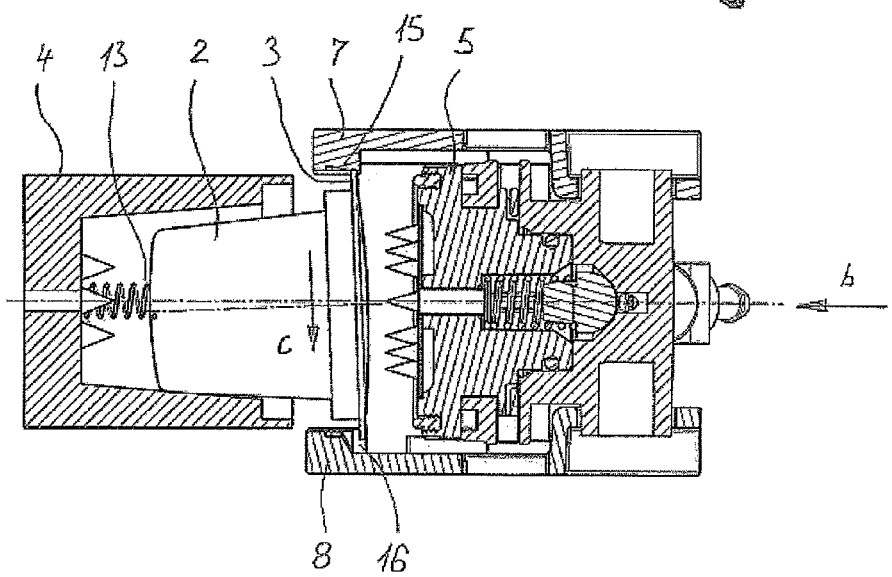
Figure 8:
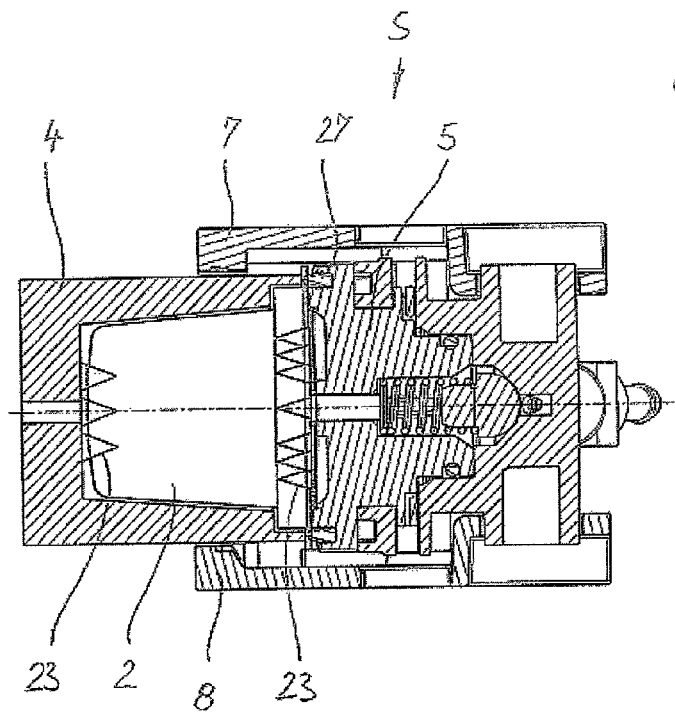
Figure 9:
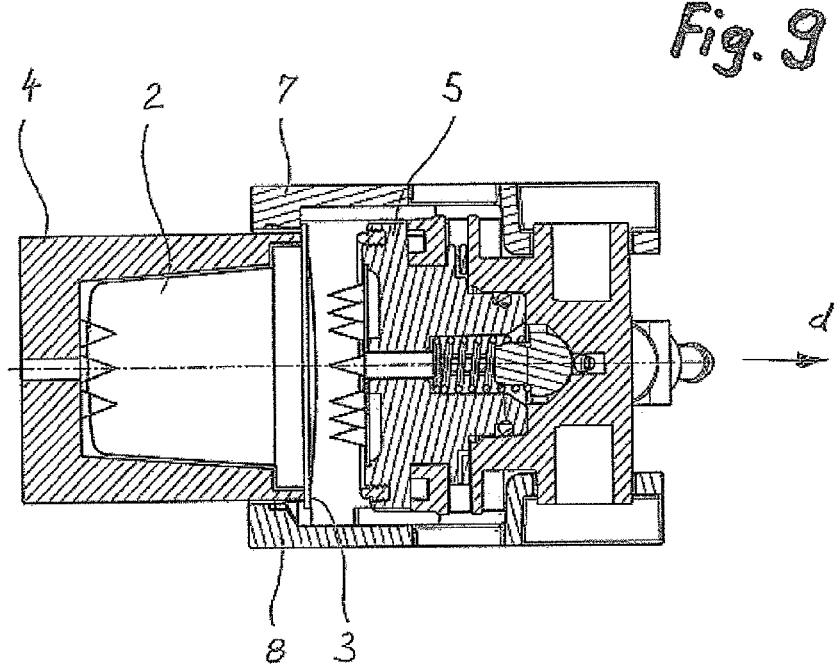
Figure 10:
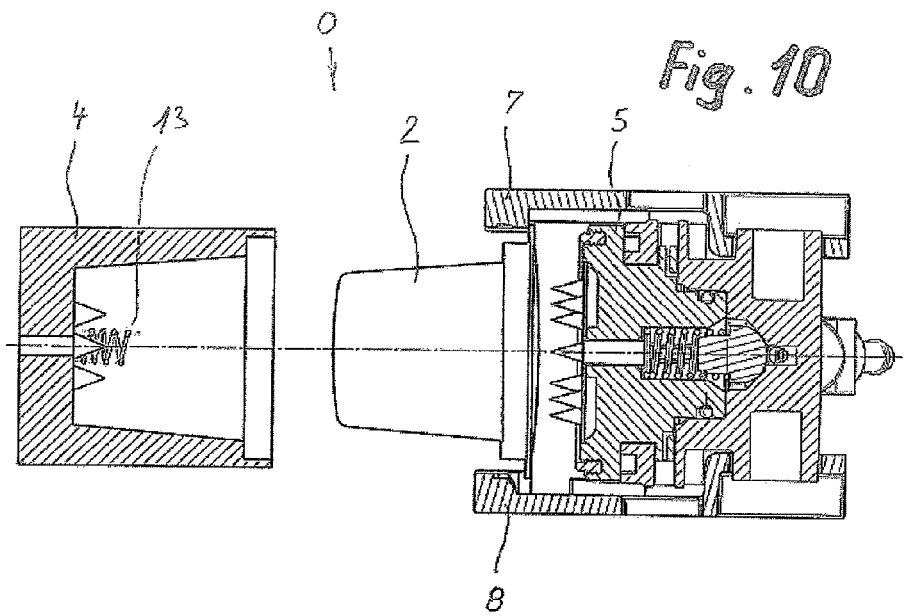
Figure 11:
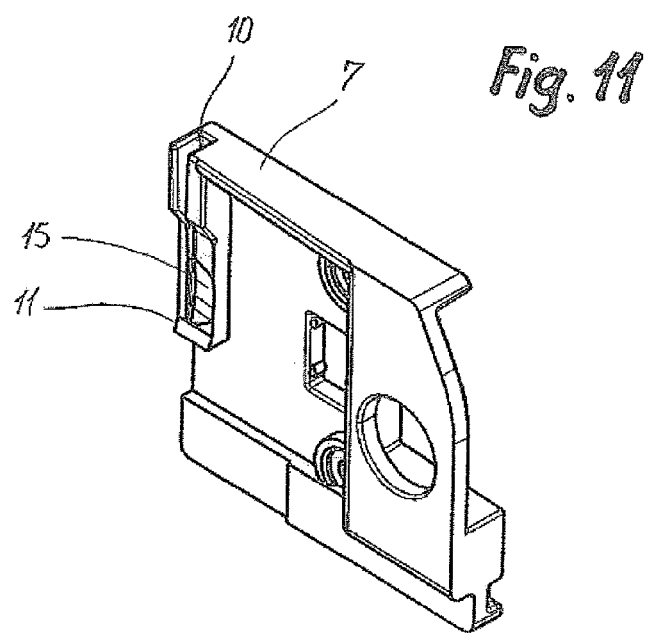

Further advantages and individual features of the invention can be gathered from the exemplary embodiment described below and from the drawings, in which:

FIG. 1 shows a perspective illustration of a device according to the invention in an open position with a capsule in the intermediate position, FIG. 2 shows a perspective illustration of the open chamber parts before a capsule is inserted, FIG. 3 shows the chamber parts according to FIG. 2 with the capsule in the intermediate position, FIG. 4 shows a horizontal section through the arrangement according to FIG. 3, FIG. 5 shows the two chamber parts according to FIG. 4 during the closing process, FIG. 6 shows the chamber parts according to FIG. 5 in the first movement phase when the collar is released from the release guide, FIG. 7 shows the chamber parts according to FIG. 6 in the second movement phase when the collar is released from the articulation guide, FIG. 8 shows the chamber parts which are pressed against one another in a sealing manner, FIG. 9 shows the chamber parts when retracted into the open position, FIG. 10 shows the chamber parts according to FIG. 9 when the capsule is ejected, FIG. 11 shows a perspective side view of the articulation guide, FIG. 12 shows a perspective side view of the release guide, FIG. 13 shows an enlarged plan view of the release guide according to FIG. 12 in the region of the recess, and FIG. 14 shows a perspective side view of the release guide according to FIG. 12 from a different perspective.

As illustrated in FIG. 1, the device, which is denoted 1 overall, comprises a frame 12, in which a capsule holder 4 is fixedly arranged. A closure element 5 is mounted in the frame in a moveable manner and can be pressed against the capsule holder 4 in a sealing manner. In the illustrated open position, a capsule 2 with a circumferential collar 3 is held in an intermediate position between the capsule holder 4 and the closure element 5 by a positioning unit 6.

An operating lever 17 is mounted on the frame 12 such that it can be pivoted about a lever articulation axis 18 for the purpose of displacing the closure element 5 and for the purpose of applying the closing force. The operating lever is connected to a short lever arm 19 which has connected to its end in an articulated manner a coupling pair 20 which connects the closure element 5 to the end of the short lever arm 19 in an articulated manner. When the operating lever 17 is pivoted in arrow direction a, the closure element 5 and the positioning unit 6, which is fixedly connected to said closure element, obviously move toward the capsule holder 4 in arrow direction b. The ready beverage can be removed via the outlet 22 of the brewing chamber. The manner of operation of the movement mechanism is already known to a person skilled in the art and is therefore not described in any detail here. The manner in which the device 1 is to be installed, for example, in a coffee machine which contains further elements such as, for example, water tank, pump, flow heater, control means etc., is likewise known.

FIGS. 2 and 3 show further details of the device according to the invention. The capsule holder 4 is only schematically illustrated here. The positioning unit 6 comprises an articulation guide 7 and a release guide 8. Both guide sections are in the form of jaws and are arranged on both sides of the closure element 5. The penetration elements 23 can be seen on the closure element 5, said penetration elements being used to pierce the cover film or foil of the capsule 2 which is attached to the circumferential collar 3. The positioning unit 6 at the same time forms a guide carriage 21 in order to guide the entire unit in a straight line.

The capsule 2 is inserted into the guide grooves 10 by way of its circumferential collar 3 and then slides into the intermediate position illustrated in FIG. 3 under the action of the force of gravity. In this case, the capsule is held at sections of the collar 3 which are situated diametrically opposite one another. In this case, the collar is at a specific distance from the tips of the penetration elements 23. It is apparent that, in the open position, the capsule holder 4 has to be moved so far away from the guide grooves 10 that the capsule 2 can reach its end position without being impeded. In this case, the collar 3 is situated on a vertical plane which runs through the two guide grooves 10. In order to achieve a certain centering effect, the guide groves 10 taper in the downward direction in respect of their width. The articulation guide 7 and the release guide 8 are of asymmetrical design, as will be described more precisely below. The lowermost end of each guide groove is in the form of a support 11 in order to hold the capsule 2 in the intermediate position by way of its collar.

Details of the articulation guide 7 and the release guide 8 will be explained with reference to FIGS. 11 to 14 before the individual movement sequences are described. As shown in FIG. 11, a guide ramp 15 which is matched to the outside radius of the collar and which is inclined away starting from the guide groove adjoins the guide groove 10 in the region of the intermediate position of the capsule. The function of this guide ramp will be described more precisely below.

The release guide 8 illustrated in FIGS. 12 to 14 likewise has a guide groove 10 which, in the upper first section, is of identical design to the guide groove 10 in the articulation guide 7. However, a recess 9 which exposes the guide groove 10 on a side other than the groove base is arranged in the lower section in the region of the intermediate position of the capsule. Although the recess 9 is likewise matched to the outside radius of the capsule collar, this is done in such a way that the capsule collar can be pushed out of the intermediate position by the recess 9. A bevel 16 immediately adjoins the recess 9, said bevel having the effect of enabling the capsule collar to execute a lateral movement again immediately after the cut-out 9 has been passed, without said capsule collar striking anything.

A further special feature of the release guide 8 is a wedge projection 14 which is arranged beneath the recess 9 in the region of the support 11. This wedge projection has a run-on surface 24 which is inclined to the horizontal or the vertical insertion plane, and also has a retrieval surface 25 which runs approximately parallel to the insertion plane or to the guide groove 10. When the capsule collar is pushed through the recess 9, the capsule collar is slightly raised on the run-on surface 24, before dropping back after the retrieval surface has been passed. When the chamber parts are opened, the retrieval surface 25 forms a stop which engages on the capsule collar and pulls said capsule collar out of the capsule holder 4.

The movement sequences of the chamber parts and of the capsule will be described below with reference to FIGS. 4 to 10, with reference being made to further details on the basis of FIG. 4. Said figure shows that the capsule holder 4 forms a cavity 26, the shape of this cavity being matched approximately to that of the capsule 2. Penetration elements 23 which penetrate the base of the capsule 2 when the chamber is closed are likewise arranged on the base of the cavity. A helical compression spring 13 which is compressed when the capsule is inserted and which has the effect of ejecting the capsule after the brewing process is likewise arranged on the base of the cavity. A circumferential seal 27 is arranged on the closure element 5 in order to ensure that the brewing chamber is closed in a sealing manner.

FIG. 4 shows the capsule 2 in the intermediate position before the beginning of the closing movement. In this case, the longitudinal center axis of the capsule runs approximately coaxially to the longitudinal center axis 29 of the two chamber parts. The circumferential collar 3 of the capsule is held by the articulation guide 7 and the release guide 8, but is only restricted by the latter.

According to FIG. 5, the closure element 5 has already moved some way in arrow direction b toward the capsule holder 4. The position of the capsule 2 relative to the articulation guide 7 and to the release guide 8 has not yet changed, but said capsule has already entered the cavity 26 to some extent.

According to FIG. 6, the base of the capsule 2 touches the end of the spring 13, with a force acting on the capsule 2 in arrow direction b against the closing force. Since the collar 3 of the capsule is still firmly held by the articulation guide 7, but can pass the recess 9 at the release guide 8, the capsule rotates slightly about the articulation guide 7. This results in an oblique position of the capsule through an angle α with respect to the longitudinal center axis 28 in a first movement phase.

According to FIG. 7, the base of the capsule 2 is still situated on the end of the helical compression spring 13. As the closure element 5 continues to be moved further in arrow direction b, the guide ramp 15 implements a lateral movement of the capsule in arrow direction c, and therefore the collar 3 is also freed from the articulation guide 7. This lateral movement is assisted by the bevel 16 on the release guide 8. The closure element 5 has now already approached the capsule holder 4 to such an extent that the freed capsule can no longer drop.

In the closed position S according to FIG. 8, the chamber parts 4 and 5 are pressed against one another in a sealing manner, with the circumferential seal 27 being situated on the outside of the collar. The penetration elements 23 have penetrated the base and the cover of the capsule 2, and therefore hot water, for example, can be conducted through the capsule in a manner not illustrated in any detail. The distance between the articulation guide 7 and the release guide is selected such that these two guides can accommodate the capsule holder 4 between them in the closed position S.

According to FIG. 9, the closure element 5 is removed from the capsule holder 4 again in arrow direction d after the brewing process. As soon as the penetration elements 23 on the closure element 5 leave the capsule 2, the helical compression spring on the base of the cavity likewise exerts a force on the capsule 2 in arrow direction d. In addition, the above-described wedge projection engages on the rear face of the collar 3 and pulls the capsule out of the cavity.

According to FIG. 10, the closure element 5 has again reached the open position O, with the capsule 2 now no longer being held between the articulation guide 7 and the release guide 8 but, without support, being able to drop into a collection container.

The invention claimed is:

1. A device for preparing a beverage from a substance, which is contained in a capsule with a circumferential collar, using a liquid, comprising
    two chamber parts which can be pressed against one another in a sealing manner for the purpose of receiving the capsule and which can be moved relative to one another between an open device and a closed device,
    the capsule being holdable in an intermediate position between the chamber parts by means of a positioning unit in the open position device and the liquid being passable through the capsule in the closed device, and
    wherein the positioning unit has two guide sections, which are shaped differently and situated opposite one another on a insertion plane, for guiding the capsule at sections of the collar which are situated diametrically opposite one another and for holding the capsule in the intermediate position,
    wherein one guide section is in the form of an articulation guide and the opposite guide section is in the form of a release guide, with the release guide having a recess which is shaped so that the capsule can be rotated about the articulation guide out of the intermediate position and can be released from the release guide, with the capsule being freed from the release position in a first movement phase and from the articulation guide in a second movement phase as a result of being acted on by one of the chamber parts before the device is closed.

2. The device as claimed in claim 1, wherein the articulation guide is shaped to allow rotation of the capsule through an angle of 0° to 45° out of the insertion plane.

3. The device as claimed in claim 2, wherein the articulation guide has a guide groove, which is approximately V-shaped or approximately U-shaped in cross section, at least in the region of the intermediate position.

4. The device as claimed in claim 2, wherein the articulation guide has a guide groove that can be widened for the purpose of rotating or tilting the capsule.

5. The device as claimed in claim 1, wherein the two guide sections form a support for the collar for the purpose of holding the capsule in the intermediate position.

6. The device as claimed in claim 1, wherein one of the chamber parts is arranged fixedly on a frame, and wherein the other chamber part is mounted in the frame in a displaceable manner.

7. The device as claimed in claim 6, wherein the positioning unit is associated with the displaceable chamber part and can be displaced together with said displaceable chamber part.

8. The device as claimed in claim 6, wherein the fixedly arranged chamber part is in the form of a capsule holder with a cavity for accommodating the capsule, and the displaceable chamber part is in the form of a closure element for closing the cavity.

9. The device as claimed in claim 8, wherein the two guide sections can be pushed over the capsule holder on either side when the cavity is closed.

10. The device as claimed in claim 1, wherein one of the chamber parts has a spring which can be compressed in the closed device when the capsule is accommodated and with which the capsule can be ejected from the chamber part in the open device.

11. The device as claimed in claim 1, wherein the positioning unit has retrieval means with which the capsule can be retrieved from one of the chamber parts by way of its collar.

12. The device as claimed in claim 11, wherein the retrieval means is a wedge projection which is arranged beneath the recess on the release guide and has a run-on surface which is inclined toward the insertion plane and has a retrieval surface which is situated approximately in the insertion plane.

13. The device as claimed in claim 1, wherein the articulation guide has a guide ramp which forces the capsule to perform a lateral movement when the capsule is freed from the articulation guide in the second movement phase.

14. The device as claimed in claim 13, wherein the release guide has a bevel in the region of the recess, said bevel allowing the capsule to perform a lateral movement in the second movement phase.

15. The device as claimed in claim 8, wherein a spring, which can be compressed in the closed device when the capsule is received and with which the capsule can be ejected from the capsule holder in the open device, is arranged at the base of the cavity, and wherein the capsule can be acted on by the end of the spring in order to be freed from the positioning unit.

16. A system comprising a device for preparing a beverage as claimed in claim 1 and a capsule with a circumferential collar containing a substance.

17. A device for preparing a beverage from a substance, which is contained in a capsule with a circumferential collar, using a liquid, comprising two chamber parts which can be pressed against one another in a sealing manner for the purpose of receiving the capsule and which can be moved relative to one another between an open device and a closed device, the capsule being holdable in an intermediate position between the chamber parts by means of a positioning unit in the open device and the liquid being passable through the capsule in the closed device, and wherein the positioning unit has two guide sections, which are shaped differently and situated opposite one another on a insertion plane, for guiding the capsule at sections of the collar which are situated diametrically opposite one another and for holding the capsule in the intermediate position, wherein one guide section is in the form of an articulation guide and the opposite guide section is in the form of a release guide, with the release guide having a recess which is designed so that the capsule can be rotated about the articulation guide out of the intermediate position and can be released from the release guide, with the capsule being freed from the release position in a first movement phase and from the articulation guide in a second movement phase as a result of being acted on by one of the chamber parts before the device is closed, wherein the articulation guide has a guide ramp which forces the capsule to perform a lateral movement when the capsule is freed from the articulation guide in the second movement phase, and wherein the release guide has a bevel in the region of the recess, said bevel allowing the capsule to perform a lateral movement in the second movement phase.

\* \* \* \* \*